Patented Dec. 21, 1937

2,102,734

UNITED STATES PATENT OFFICE 2,102,734

PREPARATION FOR TREATING PLANTS

Edward P. Naus, Minneapolis, Minn.

No Drawing. Original application July 29, 1933, Serial No. 682,887. Divided and this application May 25, 1936, Serial No. 81,714

1 Claim. (Cl. 167—29)

This invention relates to an improved preparation for treating plants, trees, and shrubbery, and more particularly to a preparation for exterminating potato bugs, aphides, and practically all species of insects, whether of the eating or sucking kind, which are destructive to plant life.

The present application is a division of my application, Serial No. 682,887, filed July 29, 1933.

An object of this invention is to provide a preparation for treating plants, trees, shrubbery, and the like, to rid them of insects and various plant diseases, which is composed principally of pulverized asphalt pitch, with which other ingredients may, when desired, be mixed to provide the desired results.

A further object is to provide a preparation of the class described which is in the form of a fine dry powder, which may be applied to the plants in the form of a dry dust or may be mixed with a suitable liquid and wet sprayed onto the plants, said preparation, whether in dust or liquid form, having the inherent characteristic of adhering to the leaves and stalks of the plants, whereby it is not readily removed therefrom by the elements.

The invention consists primarily of applying the pitch directly onto the plants, either by dusting it thereon in the form of a fine, dry powder or dust, or applying it thereto as a wet spray, by mixing it with a suitable liquid, such as water. The preparation has been found very effective for exterminating potato bugs, and in many cases a single application during the season has been found sufficient, this resulting because of the inherent characteristic of the preparation to adhere to the plants, regardless of winds or rains, and further, because the preparation has the ability to retain its destructive effects upon bugs and insects for a long period of time, even when exposed to the elements.

The preparation has proven equally effective in the extermination of other insects such as aphides and small plant lice of the sucking kind, found on various kinds of plants, shrubbery and trees, and which, on account of their numbers, often do great damage.

The preparation is composed principally of finely ground or pulverized asphalt pitch. This material is reduced to a fine dust-like powder, in which state it may be kept in storage indefinitely without deteriorating. It is preferably applied to the plants in a dry state, and may readily be dusted on by hand, or it may be blown onto the plants by any suitable apparatus applicable for the purpose. It may also be applied to the plants as a wet spray, as the powdered pitch may readily be mixed with water or any other suitable liquid.

Asphalt pitch is naturally of a viscous nature, which characteristic it retains even when compounded into my improved preparation. The viscous nature of the pitch adds to its usefulness in a preparation of this kind, because it causes it to adhere or bond itself to the plants onto which it is applied, regardless of whether it is applied as a dry dust or as a wet spray. Also, because of the adherent qualities of the preparation, it can be applied to the plants with equal results, whether the plants are wet or dry, which is quite an advantage, as it eliminates the necessity of having to mix therewith, a suitable spreader, such as soap suds, to cause it to adhere to the leaves and stalks of the plants, which is often necessary when using other preparations or compounds of a similar character.

The preparation is inexpensive, and embodies all of the qualities desirable in a product of this character. It is readily applied to the plants, and because of its tendency to adhere thereto for a long period of time, regardless of the elements, and still retain its effectiveness, it greatly reduces the cost of treating the plants for, as hereinbefore stated, in many cases a single application has been found sufficient for an entire season.

I claim as my invention:

A dry preparation for protecting plants, trees, and shrubs against the ravages of bugs, insects, and plant diseases, composed substantially entirely of finely pulverized asphalt pitch, whereby it may readily be applied to the plants in a dry, dust-like powder which readily adheres thereto.

EDWARD P. NAUS.